(12) United States Patent
Tojo

(10) Patent No.: US 7,734,095 B2
(45) Date of Patent: Jun. 8, 2010

(54) INFORMATION PROCESSING APPARATUS AND INFORMATION PROCESSING METHOD

(75) Inventor: Hiroshi Tojo, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 710 days.

(21) Appl. No.: 11/251,789

(22) Filed: Oct. 18, 2005

(65) Prior Publication Data

US 2006/0083443 A1    Apr. 20, 2006

(30) Foreign Application Priority Data

Oct. 19, 2004    (JP) .............................. 2004-304341

(51) Int. Cl.
*G06K 9/46* (2006.01)
*G06K 9/66* (2006.01)
*G06K 9/54* (2006.01)
*G06K 9/60* (2006.01)

(52) U.S. Cl. ...................................... 382/190; 382/305

(58) Field of Classification Search ................. 382/305, 382/190
See application file for complete search history.

(56) References Cited

U.S. PATENT DOCUMENTS

| | | | | |
|---|---|---|---|---|
| 5,282,225 A | * | 1/1994 | Nikias et al. ................. | 375/232 |
| 5,301,255 A | * | 4/1994 | Nagai et al. .................. | 704/230 |
| 5,402,333 A | * | 3/1995 | Cardner ........................ | 700/31 |
| 5,511,423 A | * | 4/1996 | Sugiyama et al. ............. | 73/602 |
| 5,566,215 A | * | 10/1996 | Coquerel ..................... | 375/371 |
| 5,714,956 A | * | 2/1998 | Jahne et al. ................... | 341/155 |
| 5,822,742 A | * | 10/1998 | Alkon et al. ................... | 706/31 |
| 5,905,814 A | * | 5/1999 | Mochizuki et al. ........... | 382/239 |
| 5,966,701 A | * | 10/1999 | Kohda et al. .................. | 706/20 |
| 6,141,461 A | * | 10/2000 | Carlini ......................... | 382/261 |
| 6,157,876 A | * | 12/2000 | Tarleton et al. ............... | 701/16 |
| 6,205,335 B1 | * | 3/2001 | Furusawa et al. ............ | 455/436 |
| 6,633,683 B1 | * | 10/2003 | Dinh et al. ................... | 382/260 |
| 6,671,402 B1 | * | 12/2003 | Pass et al. .................... | 382/170 |
| 6,711,306 B1 | * | 3/2004 | Denber ........................ | 382/308 |
| 6,834,288 B2 | * | 12/2004 | Chen et al. ................ | 707/104.1 |
| 6,999,636 B1 | | 2/2006 | Enokida et al. ............. | 382/305 |
| 7,106,903 B2 | * | 9/2006 | Chang et al. ................. | 382/190 |
| 7,349,558 B2 | * | 3/2008 | Enomoto ..................... | 382/118 |
| 2002/0164075 A1 | * | 11/2002 | Acharya et al. ............. | 382/190 |
| 2003/0044062 A1 | * | 3/2003 | Ganapathy et al. .......... | 382/165 |
| 2003/0086021 A1 | | 5/2003 | Tojo ............................ | 348/700 |
| 2004/0114615 A1 | | 6/2004 | Virtanen et al. ............. | 370/410 |
| 2005/0013491 A1 | * | 1/2005 | Cieplinski ................... | 382/226 |
| 2005/0046708 A1 | * | 3/2005 | Lim et al. ................. | 348/231.6 |
| 2006/0008174 A1 | * | 1/2006 | Avinash et al. .............. | 382/275 |

(Continued)

FOREIGN PATENT DOCUMENTS

JP        2001-143080        5/2001

*Primary Examiner*—Vikkram Bali
*Assistant Examiner*—Michelle Entezari
(74) *Attorney, Agent, or Firm*—Fitzpatrick, Cella, Harper & Scinto

(57) ABSTRACT

Distances between a query image and registered images are calculated for respective feature amounts, and weight values for the calculated distances are calculated on the basis of statistical amount of the feature amounts of the query image (S507). Similarities between the registered images and query image are calculated on the basis of the results obtained by weighting the distances for respective feature amounts by the calculated weight values (S508). Images similar to the query image are displayed as a list on the basis of the calculated similarities (S510).

5 Claims, 15 Drawing Sheets

U.S. PATENT DOCUMENTS

2006/0053003 A1* 3/2006 Suzuki et al. ............... 704/216
2006/0056722 A1* 3/2006 Moroney .................... 382/266
2006/0257053 A1* 11/2006 Boudreau et al. ........... 382/305

* cited by examiner

FIG. 7

| IMAGE ID | BRIGHTNESS FEATURE AMOUNT | EDGE FEATURE AMOUNT | PATH TO IMAGE FILE |
|---|---|---|---|
| 1 | 1, 5, 0, 7, ···, 3 | 0.1, 0.3, ···, 0.2 | c : ¥picture¥dog.bmp |
| 2 | 7, 3, 4, 2, ···, 0 | 0.0, 0.7, ···, 0.1 | c : ¥picture¥cat.bmp |
| : | : | : | : |

F I G. 11A
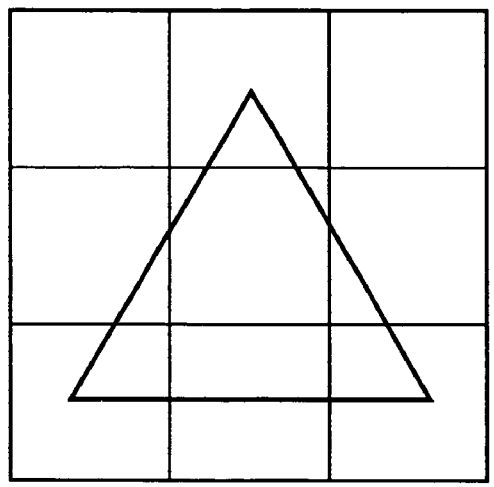
F I G. 11B
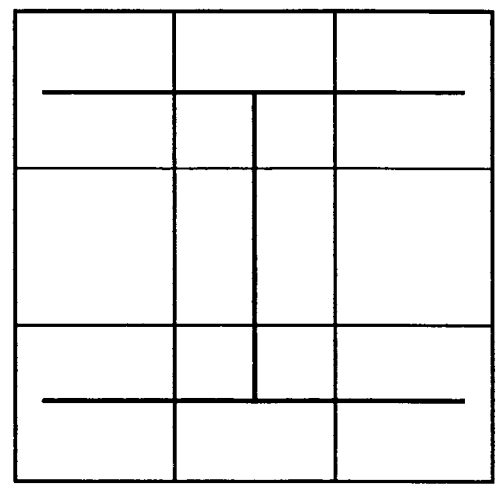

INFORMATION PROCESSING APPARATUS AND INFORMATION PROCESSING METHOD

FIELD OF THE INVENTION

The present invention relates to a technique that pertains to image retrieval.

BACKGROUND OF THE INVENTION

Conventionally, the following image retrieval method has been proposed. That is, feature amounts associated with a color, brightness, shape, texture, and the like are extracted by analyzing an image, and are stored as indices in association with the image. Similarities between the feature amounts of an input image (query image) and those of a plurality of stored images are calculated to retrieve an image similar to the query image from the plurality of stored images (an image with a similarity closer to 100% is most similar to the query image).

When a plurality of feature amounts are used in image retrieval, a similarity is calculated by weighting those for respective feature amounts. For example, there are two different feature amounts (feature amounts 1 and 2), and let R1 and R2 be similarities for these feature amounts, and W1 and W2 be weights for these similarities. Then, a final similarity R between images is given by:

$$R=(W1 \times R1+W2 \times R2)/(W1+W2) \quad (1)$$

If the weights W1=1 and W2=1, the two different feature amounts are treated equally. On the other hand, if the weights W1=3 and W2=1, an image similar to a query image is retrieved while attaching more importance to feature amount 1 than feature amount 2.

In order to implement high-precision image retrieval, it is necessary to appropriately set these weights. Japanese Patent Laid-Open No. 2001-143080 (corresponding U.S. application Ser. No. 09/707,050) discloses a method of designating weights by the user. This method is effective in the following case. For example, when the user inputs a handwritten query image depending on his or her memory, he or she cannot precisely draw ambiguous features. In this manner, the above method is effective when the user can recognize that a specific feature between a query image and desired image is similar compared to other features and which feature is more similar.

Even when an image similar to a desired image is given as a query image, a feature to be weighted may be changed depending on the contents of the image. For example, a printed image of an original image is scanned by a scanner to obtain a scan image, and the scan image is used as a query image. At this time, obviously, the scan image is very similar to the original image.

For example, when images are line images drawn by simple line segments, as shown in FIGS. 11A and 11B, a feature associated with a shape is distinguishable most easily, but color and brightness features are hard to distinguish since there are few such features. FIGS. 11A and 11B show examples of line images.

The user can visually determine a feature to be weighted in case of images formed by simple line segments, as shown in FIGS. 11A and 11B. Even in case of a line image of the same kind, when an image is formed by more complicated figures, and respective figures are hatched and shaded, a brightness feature and the like become also important.

That is, as an image has more complicated contents, it becomes harder to visually determine features and their weights.

In such case, it is difficult for the method of Japanese Patent Laid-Open No. 2001-143080 to designate appropriate weights. Therefore, it is difficult for that method to attain retrieval with higher precision.

When a large number of queries are input to conduct a plurality of retrieval processes at the same time, if the method of Japanese Patent Laid-Open No. 2001-143080 is applied, weights must be designated for each retrieval, thus imposing a heavy load on the user.

SUMMARY OF THE INVENTION

The present invention has been made in consideration of the aforementioned problems, and has as its object to provide a technique for implementing image retrieval with higher precision by appropriately setting weights for respective similarities of image features upon image retrieval.

In order to achieve an object of the present invention, for example, an information processing apparatus of the present invention comprises the following arrangement.

That is, an information processing apparatus characterized by comprising:

holding means for holding a plurality of sets of media and at least two feature amounts of the media in correspondence with each other;

read means for reading out the at least two feature amounts from the holding means;

input means for inputting a medium as a query;

feature amount acquisition means for acquiring at least two feature amounts of the medium as the query;

calculation means for calculating similarities between corresponding feature amounts of the at least two feature amounts read out by the read means, and the at least two feature amounts acquired by the feature amount acquisition means;

weight calculation means for calculating weight values respectively for the similarities for respective feature amounts calculated by the calculation means on the basis of statistical amounts of the at least two feature amounts acquired by the feature amount acquisition means;

similarity calculation means for calculating similarities between media corresponding to the at least two feature amounts read out by the read means, and the medium as the query, on the basis of results obtained by weighting the similarities for respective feature amounts calculated by the calculation means by the weight values calculated by the weight calculation means; and output means for outputting similar candidates for the medium as the query of the media held by the holding means on the basis of the similarities calculated by the similarity calculation means.

In order to achieve an object of the present invention, for example, an information processing apparatus of the present invention comprises the following arrangement.

That is, an information processing apparatus characterized by comprising:

holding means for holding a plurality of sets of images and at least two feature amounts of the images in correspondence with each other;

read means for reading out the at least two feature amounts from the holding means;

input means for inputting an image as a query;

feature amount acquisition means for acquiring at least two feature amounts of the image as the query;

calculation means for calculating similarities between corresponding feature amounts of the at least two feature amounts read out by the read means, and the at least two feature amounts acquired by the feature amount acquisition means;

weight calculation means for calculating weight values respectively for the similarities for respective feature amounts calculated by the calculation means on the basis of statistical amounts of the at least two feature amounts acquired by the feature amount acquisition means;

similarity calculation means for calculating similarities between images corresponding to the at least two feature amounts read out by the read means, and the image as the query, on the basis of results obtained by weighting the similarities for respective feature amounts calculated by the calculation means by the weight values calculated by the weight calculation means; and output means for outputting similar candidates for the image as the query of the images held by the holding means on the basis of the similarities calculated by the similarity calculation means.

In order to achieve an object of the present invention, for example, an information processing apparatus of the present invention comprises the following arrangement.

That is, an information processing apparatus characterized by comprising:

holding means for holding a plurality of sets of images and at least two feature amounts of the images in correspondence with each other;

total information storage means for storing information that totals a statistical amount of the feature amounts held by the holding means;

read means for reading out the at least two feature amounts from the holding means;

input means for inputting an image as a query;

feature amount acquisition means for acquiring at least two feature amounts of the image as the query;

calculation means for calculating similarities between corresponding feature amounts of the at least two feature amounts read out by the read means, and the at least two feature amounts acquired by the feature amount acquisition means;

weight calculation means for calculating weight values respectively for the similarities for respective feature amounts calculated by the calculation means on the basis of statistical amounts of the at least two feature amounts acquired by the feature amount acquisition means and the total information stored in the total information storage means;

similarity calculation means for calculating similarities between images corresponding to the at least two feature amounts read out by the read means, and the image as the query, on the basis of results obtained by weighting the similarities for respective feature amounts calculated by the calculation means by the weight values calculated by the weight calculation means; and output means for outputting similar candidates for the image as the query of the images held by the holding means on the basis of the similarities calculated by the similarity calculation means.

In order to achieve an object of the present invention, for example, an information processing method of the present invention comprises the following arrangement.

That is, an information processing method to be executed by an information processing apparatus which comprises holding means for holding a plurality of sets of media and at least two feature amounts of the media in correspondence with each other, characterized by comprising:

a read step of reading out the at least two feature amounts from the holding means;

an input step of inputting a medium as a query;

a feature amount acquisition step of acquiring at least two feature amounts of the medium as the query;

a calculation step of calculating similarities between corresponding feature amounts of the at least two feature amounts read out in the read step, and the at least two feature amounts acquired in the feature amount acquisition step;

a weight calculation step of calculating weight values respectively for the similarities for respective feature amounts calculated in the calculation step on the basis of statistical amounts of the at least two feature amounts acquired in the feature amount acquisition step;

a similarity calculation step of calculating similarities between media corresponding to the at least two feature amounts read out in the read step, and the medium as the query, on the basis of results obtained by weighting the similarities for respective feature amounts calculated in the calculation step by the weight values calculated in the weight calculation step; and an output step of outputting similar candidates for the medium as the query of the media held by the holding means on the basis of the similarities calculated in the similarity calculation step.

In order to achieve an object of the present invention, for example, an information processing method of the present invention comprises the following arrangement.

That is, an information processing method to be executed by an information processing apparatus which comprises holding means for holding a plurality of sets of images and at least two feature amounts of the images in correspondence with each other, characterized by comprising:

a read step of reading out the at least two feature amounts from the holding means;

an input step of inputting an image as a query;

a feature amount acquisition step of acquiring at least two feature amounts of the image as the query;

a calculation step of calculating similarities between corresponding feature amounts of the at least two feature amounts read out in the read step, and the at least two feature amounts acquired in the feature amount acquisition step;

a weight calculation step of calculating weight values respectively for the similarities for respective feature amounts calculated in the calculation step on the basis of statistical amounts of the at least two feature amounts acquired in the feature amount acquisition step;

a similarity calculation step of calculating similarities between images corresponding to the at least two feature amounts read out in the read step, and the image as the query, on the basis of results obtained by weighting the similarities for respective feature amounts calculated in the calculation step by the weight values calculated in the weight calculation step; and an output step of outputting similar candidates for the image as the query of the images held by the holding means on the basis of the similarities calculated in the similarity calculation step.

In order to achieve an object of the present invention, for example, an information processing method of the present invention comprises the following arrangement.

That is, an information processing method to be executed by an information processing apparatus which comprises holding means for holding a plurality of sets of images and at least two feature amounts of the images in correspondence with each other, characterized by comprising:

a total information storage step of storing information that totals a statistical amount of the feature amounts held by the holding means;

a read step of reading out the at least two feature amounts from the holding means;

an input step of inputting an image as a query;

a feature amount acquisition step of acquiring at least two feature amounts of the image as the query;

a calculation step of calculating similarities between corresponding feature amounts of the at least two feature amounts read out in the read step, and the at least two feature amounts acquired in the feature amount acquisition step;

a weight calculation step of calculating weight values respectively for the similarities for respective feature amounts calculated in the calculation step on the basis of statistical amounts of the at least two feature amounts acquired in the feature amount acquisition step and the total information stored in the total information storage step;

a similarity calculation step of calculating similarities between images corresponding to the at least two feature amounts read out in the read step, and the image as the query, on the basis of results obtained by weighting the similarities for respective feature amounts calculated in the calculation step by the weight values calculated in the weight calculation step; and an output step of outputting similar candidates for the image as the query of the images held by the holding means on the basis of the similarities calculated in the similarity calculation step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a table showing an example of the format of indices for respective images;

FIG. 11A shows an example of a line image;

FIG. 11B shows an example of a line image;

DETAILED DESCRIPTION OF THE PREFERRED EMBODIMENTS

Preferred embodiments of the present invention will now be described in detail in accordance with the accompanying drawings.

First Embodiment

Figure 1:
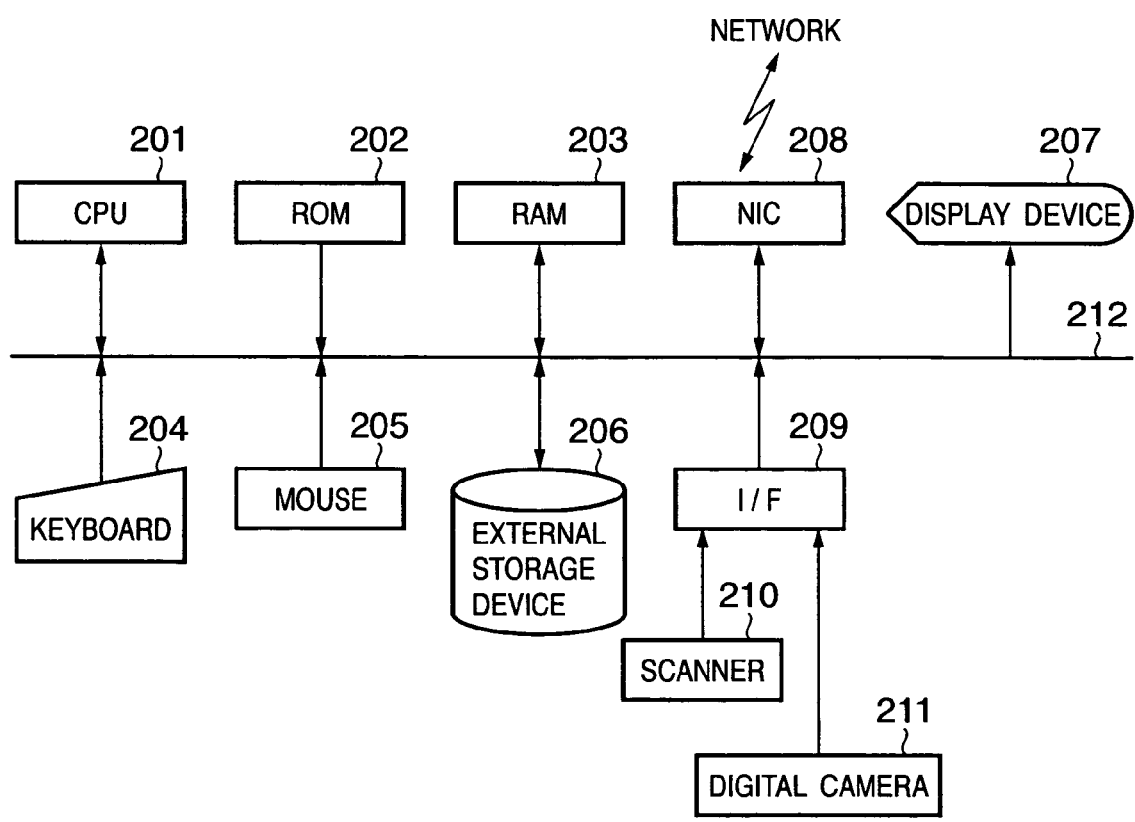
FIG. 1 is a block diagram showing the basic arrangement and peripheral devices of a computer, which serves as an information processing apparatus according to the first embodiment of the present invention.

FIG. 1 is a block diagram showing the basic arrangement and peripheral devices of a computer, which serves as an information processing apparatus according to this embodiment. Note that, for example, a general PC (personal computer), WS (workstation), and the like can be applied as this computer.

Referring to FIG. 1, reference numeral 201 denotes a CPU which controls the overall computer, and executes respective processes to be described later executed by the computer.

Reference numeral 202 denotes a ROM which stores setting data, a boot program, and the like of this computer.

Reference numeral 203 denotes a RAM which comprises an area for temporarily storing programs and data loaded from an external storage device 206, an area for temporarily storing data received via an NIC (network interface) 208, and an area for temporarily storing image data captured from a scanner 210 and digital camera 211 via an I/F (interface) 209. The RAM 203 also comprises a work area used when the CPU 201 executes various processes.

Reference numerals 204 and 205 respectively denote a keyboard and mouse, which can input various instructions to the CPU 201 when they are operated by the user, as is well known.

Reference numeral 206 denotes an external storage device which serves as a large-capacity information storage device such as a hard disk drive device. The external storage device 206 saves an OS (operating system), programs and data which make the CPU 201 execute respective processes to be described later executed by the computer, and the like. When some or all of these programs and data are loaded onto the RAM 203 under the control of the CPU 201, and the CPU 201 executes processing using these programs and data, this computer can execute respective processes to be described later as its own processes.

Reference numeral 207 denotes a display device which comprises a CRT, liquid crystal display, or the like, and can display the execution result of the CPU 201 by means of images, characters, and the like.

Reference numeral 208 denotes an NIC (network interface), which serves as an interface upon exchanging data via a network such as a LAN, Internet, or the like. The NIC 208 suited to either a wireless or wired network can be used.

Reference numeral 209 denotes an I/F such as IEEE1394, USB, or the like, which is used to connect the scanner 210 and digital camera 211 to this computer. Data of an image scanned from a printing medium such as a paper sheet or the like by the scanner 210 and data of an image sensed by the digital camera 211 can be input to this computer via this I/F 209.

Reference numeral 212 denotes a bus which interconnects the aforementioned units.

Reference numeral 210 denotes a general scanner; and 211, a general digital camera.

In the above arrangement, the external storage device 206, scanner 210, and digital camera 211 are not limited to the arrangement of this computer which includes them. For example, these devices may be connected on the network and make data communications via the NIC 208.

Figure 2:
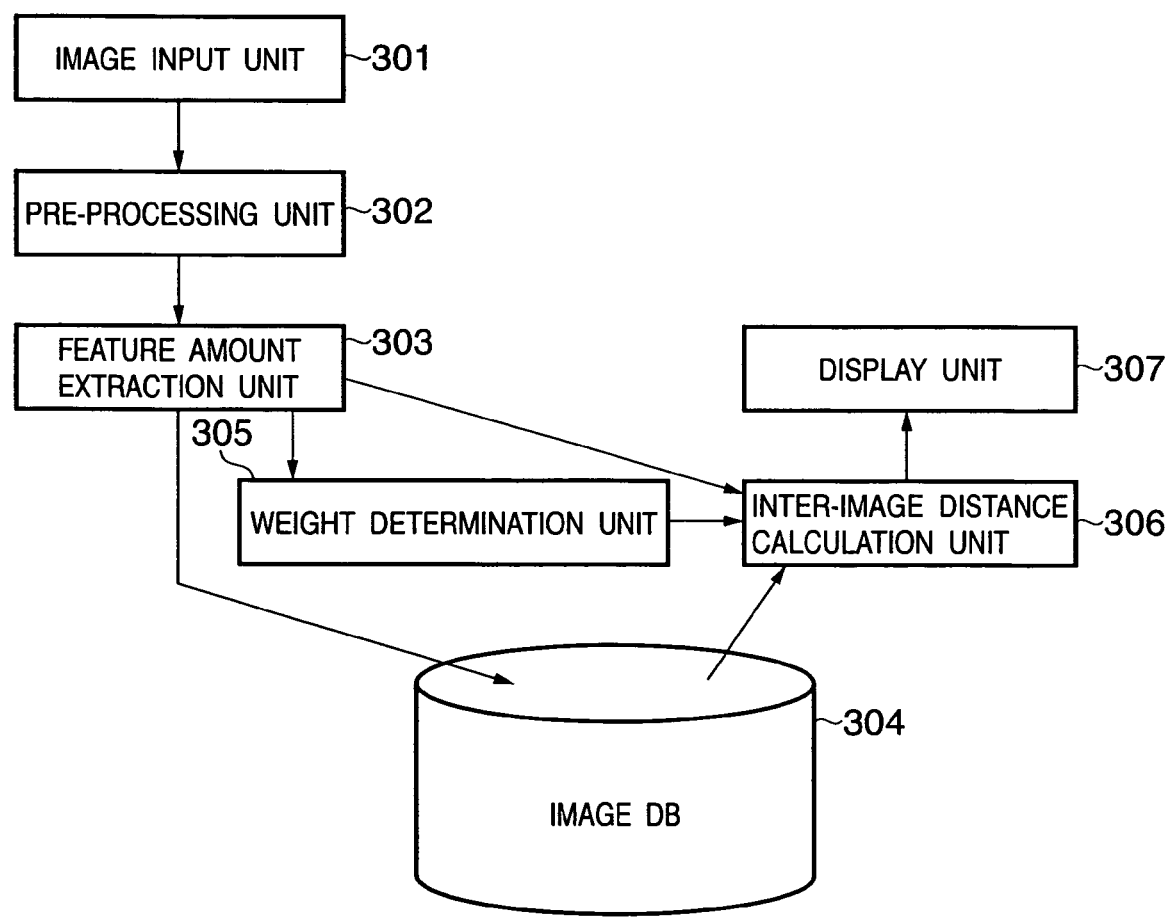
FIG. 2 is a block diagram showing the functional arrangement of the computer.

FIG. 2 is a block diagram showing the functional arrangement of the computer.

Referring to FIG. 2, reference numeral 301 denotes an image input unit which inputs an image captured by a device such as the scanner 210, digital camera 211, or the like via the interface 209, or an image held by a device on the Internet via the NIC 208.

Reference numeral 302 denotes a pre-processing unit which applies pre-processing to an input image. Reference numeral 303 denotes a feature amount extraction unit which executes processing for extracting feature amounts from the image pre-processed by the pre-processing unit 302. Reference numeral 304 denotes an image database (DB) which stores and manages the image pre-processed by the pre-processing unit 302 and the feature amounts extracted by the feature amount extraction unit 303.

Reference numeral 305 denotes a weight determination unit which executes processing for calculating weight values used to calculate similarities (inter-image distances) between an image as a query and those which are held in the image DB 304. Reference numeral 306 denotes an inter-image distance calculation unit which calculates similarities (inter-image distances) between an image as a query and those which are held in the image DB 304 using the weight values obtained from the weight determination unit 305. Reference numeral 307 denotes a display unit which displays an image retrieval result to the user.

<Registration Processing>

Figure 3:
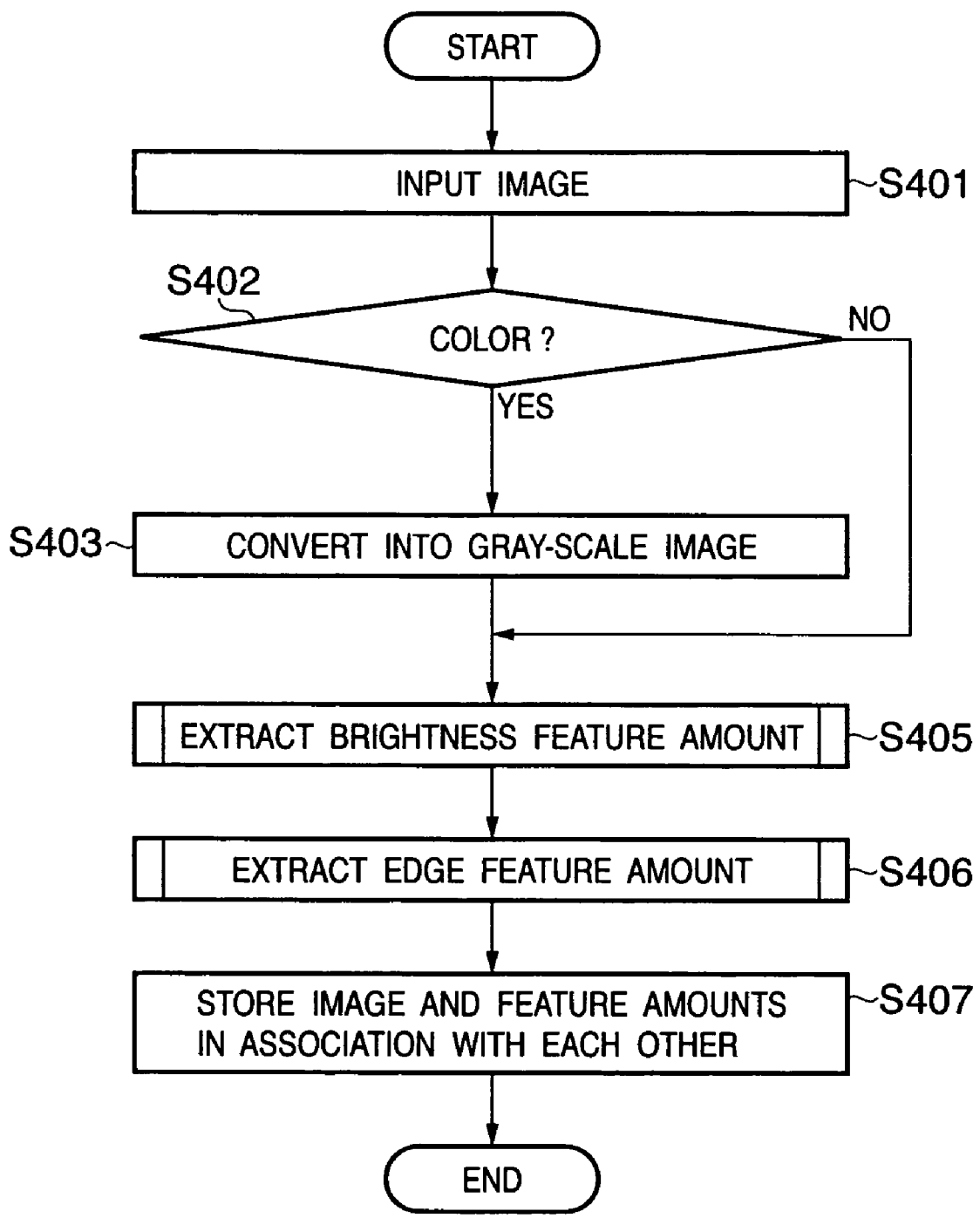
FIG. 3 is a flowchart showing processing for registering an image in the computer.

Processing for registering an image in this computer will be described below using FIG. 3 which is the flowchart of this processing. Note that a program for making the CPU 201 execute processing according to the flowchart of FIG. 3 is saved in the external storage device 206, is loaded onto the RAM 203 under the control of the CPU 201, and is executed by the CPU 201. In this way, this computer executes respective processes to be described later.

Upon detection of an image transferred from the scanner 210 or digital camera 211 via the I/F 209 or an image downloaded via the NIC 208, the CPU 201 sequentially inputs data of the image input to this computer to the RAM 203 after detection (step S401).

The CPU 201 then checks if the image input to the RAM 203 (input image) is a color or gray-scale image (step S402). If the input image is a color image, the flow advances to step S403, and the CPU 201 converts this color image into a gray-scale image (step S403). This is because this embodiment adopts feature amounts based on brightness. If other feature amounts are adopted, pre-processing is applied to an image accordingly.

When, for example, the input image is acquired from the digital camera 211, the checking process in step S402 (that for checking if the input image is a color or gray-scale image) can be attained by analyzing the data format of the image and referring to its header information. On the other hand, when the image is acquired from the scanner 210, the checking process can be attained based on the scan conditions set by the user.

Conversion into a gray-scale image in step S403 can be attained by converting R (red), G (green), and B (blue) values of each pixel in the color image data into a gray-scale signal (Y) by:

$$Y = 0.299 \times R + 0.587 \times G + 0.114 \times B \quad (2)$$

If the input image is a gray-scale image, the flow advances from step S401 to step S405 via step S402.

The CPU 201 executes processing for calculating a brightness feature amount from the input image (gray-scale image) (step S405). Details of the processing in this step will be described later.

The CPU 201 then executes processing for calculating an edge feature amount from the input image (gray-scale image) (step S406). Details of the processing in this step will be described later.

The CPU 201 saves an index including the brightness and edge feature amounts obtained in steps S405 and S406 in the external storage device 206 in association with the input image (gray-scale image) (step S407).

In this way, one image is registered in the external storage device 206. Such processing is done for each image input to this computer. Note that the image and index to be saved in the external storage device 206 may be compressed as needed. In this case, after the image and index are read out in the following description, decompression processing must be executed.

FIG. 7 shows an example of the format of indices for respective images. As shown in FIG. 7, an index includes an ID (identifier) unique to each image, the brightness and edge feature amounts of the image, and the saving location (path) of the image in the external storage device 206.

<Brightness Feature Amount Extraction Processing>

Figure 6:
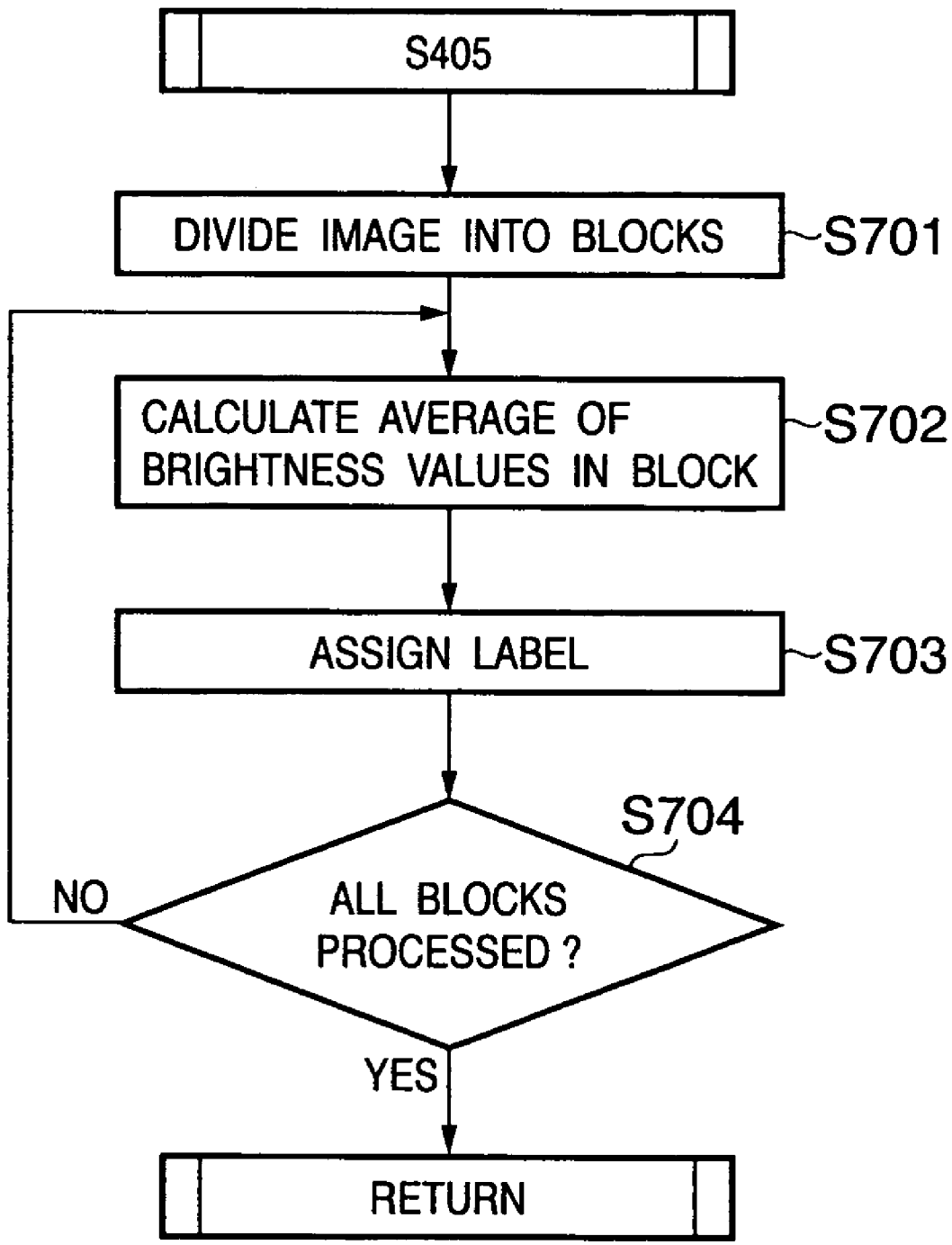
FIG. 6 is a flowchart showing details of brightness feature amount extraction processing in step S405.

Details of the brightness feature amount extraction processing in step S405 will be described below using the flowchart of FIG. 6. FIG. 6 is a flowchart showing details of the brightness feature amount extraction processing in step S405.

Figure 5:
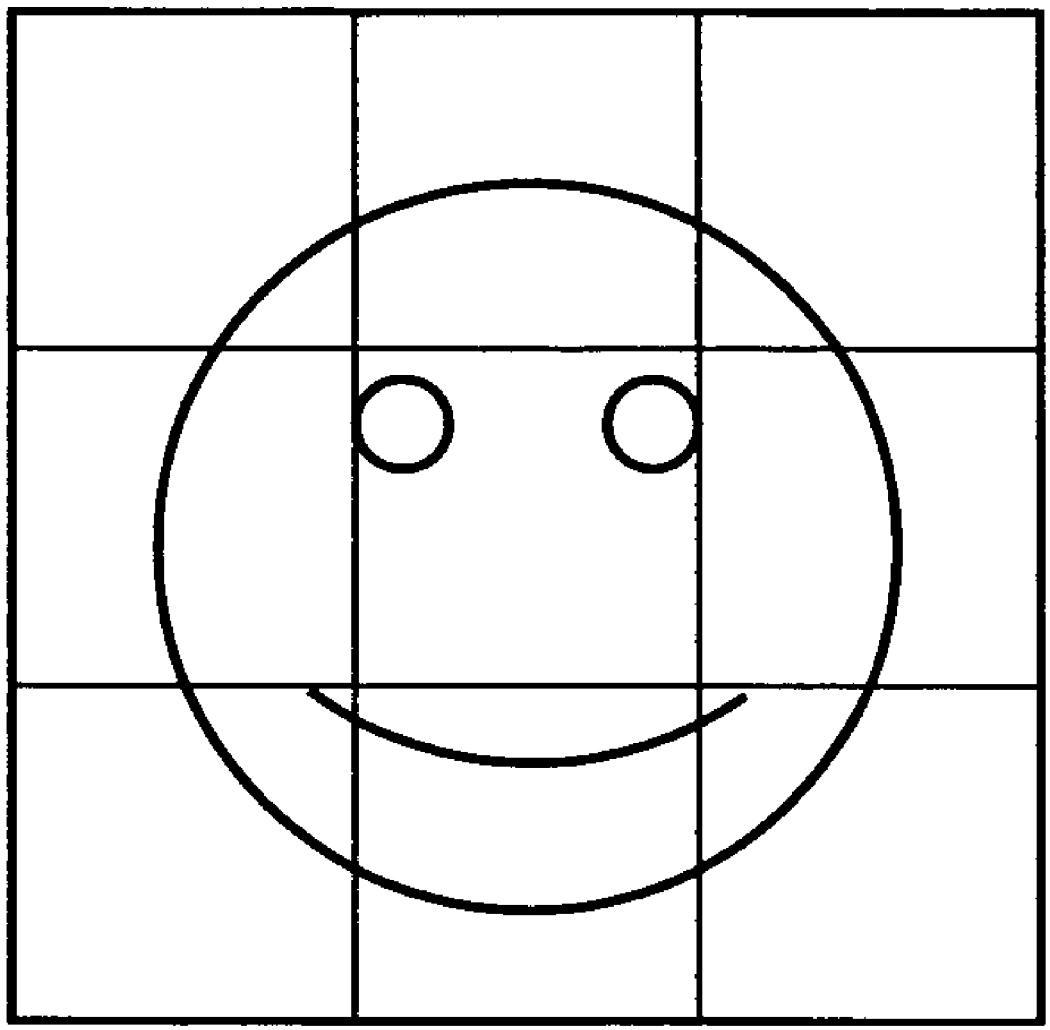
FIG. 5 shows a division example of an image.

An input image is divided into a plurality of rectangles (blocks) (step S701). In the following description, an image is divided into 3×3 blocks, as shown in FIG. 5. However, the gist of the following description is not limited to this. FIG. 5 shows a division example of an image.

Processes in steps S702 and S703 are applied to all blocks (nine blocks in FIG. 5).

An average value of brightness values in a block of interest is calculated (step S702). That is, an average value of brightness values of all pixels in the block of interest is calculated.

Next, a label corresponding to the calculated brightness value is specified (step S703). For example, if an average brightness is expressed by 8 bits (i.e., a brightness value is expressed by a value ranging from 0 to 255), a corresponding label value is specified using the following table:

| Brightness Value | Label Value |
|---|---|
| 0-31 | 0 |
| 32-63 | 1 |
| 64-95 | 2 |
| 96-127 | 3 |
| 128-159 | 4 |
| 160-191 | 5 |
| 192-223 | 6 |
| 224-255 | 7 |

Note that this table divides values 0 to 255 into 8 levels, and a label is assigned to each level. However, the number of levels is not limited to this.

It is checked if all the divided blocks have undergone the processes in steps S702 and S703 (step S704). If blocks to be processed still remain, the flow returns to step S702 to execute the subsequent processes.

On the other hand, if all the divided blocks have undergone the processes in steps S702 and S703, the processing according to the flowchart shown in FIG. 6 ends, and the control returns to step S406 in FIG. 3.

With the above processing, label values according to average brightness values can be specified for respective blocks. A set of label values specified for respective rectangles is temporarily stored in the RAM 203 as a brightness feature amount.

Upon executing the processes in steps S702 and S703, blocks are to be referred to in the order starting from the upper left block, from the left to right blocks in each row, and from upper to lower rows.

<Edge Feature Amount Extraction Processing>

Figure 8:
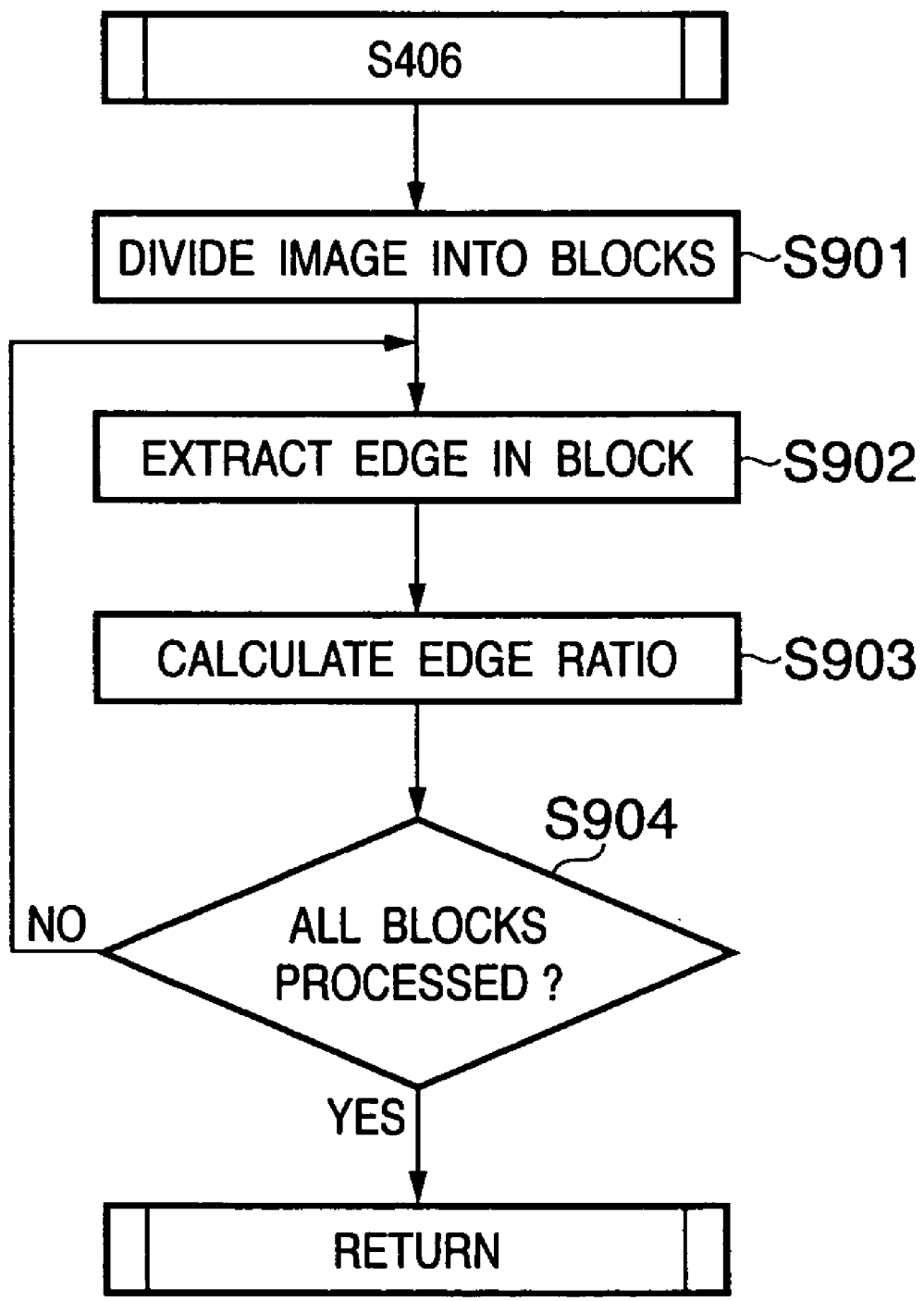
FIG. 8 is a flowchart showing details of edge feature amount extraction processing in step S406.

Details of the edge feature amount extraction processing in step S406 will be described below with reference to the flowchart of FIG. 8. FIG. 8 is a flowchart showing details of the edge feature amount extraction processing in step S406.

An input image is divided into a plurality of rectangles (blocks) (step S901). In the following description, an image is divided into 3×3 blocks, as shown in FIG. 5. However, the gist of the following description is not limited to this.

Processes in steps S902 and S903 are applied to all blocks (nine blocks in FIG. 5).

An edge in a block of interest is extracted (step S902). Various edge extraction methods are available, and a method of applying an arithmetic operation to a range including each pixel in the block of interest and its surrounding pixels using a differential filter. As the filter, a Sobel filter, Robinson filter, Kirish filter, and the like may be used. In this embodiment, a case will be exemplified wherein the arithmetic operation is made using a Prewitt filter.

Figure 9:
FIG. 9 shows an example of the configurations of a Prewitt filter.

FIG. 9 shows an example of the configurations of the Prewitt filter. The values of a pixel of interest and its eight surrounding pixels are multiplied by values of the Prewitt filter as coefficients to calculate sum totals, thus obtaining edge magnitudes for respective direction components. Of these direction components, a direction component with a largest edge magnitude is selected as an edge direction and edge magnitude of the pixel of interest. If the maximum edge magnitude is smaller than a predetermined threshold, "no edge" is determined.

Note that various edge extraction methods may be used, as described above, and these methods are state-of-the-art techniques. Hence, no more explanation will be given.

Anyhow, the process in step S902 can specify pixels that form an edge portion of those which form the block of interest. Next, in step S903 a ratio occupied by the pixels which form the edge portion of all the pixels in the block of interest is calculated (step S903). For example, let M be the number of all pixels in a block, and N be the number of pixels which form an edge portion. Then, N/M is calculated in step S903.

It is checked if all the divided blocks have undergone the processes in steps S902 and S903 (step S904). If blocks to be processed still remain, the flow returns to step S902 to execute the subsequent processes.

On the other hand, if all the divided blocks have undergone the processes in steps S902 and S903, the processing according to the flowchart shown in FIG. 8 ends, and the control returns to step S407 in FIG. 3.

With the above processing, a ratio occupied by pixels which form an edge portion of those which form a block can be calculated for each block. Then, a set of ratios calculated for respective blocks is temporarily stored in the RAM 203 as an edge feature amount.

Upon executing the processes in steps S902 and S903, blocks are to be referred to in the order starting from the upper left block, from the left to right blocks in each row, and from upper to lower rows.

<Retrieval Processing>

Figure 4:
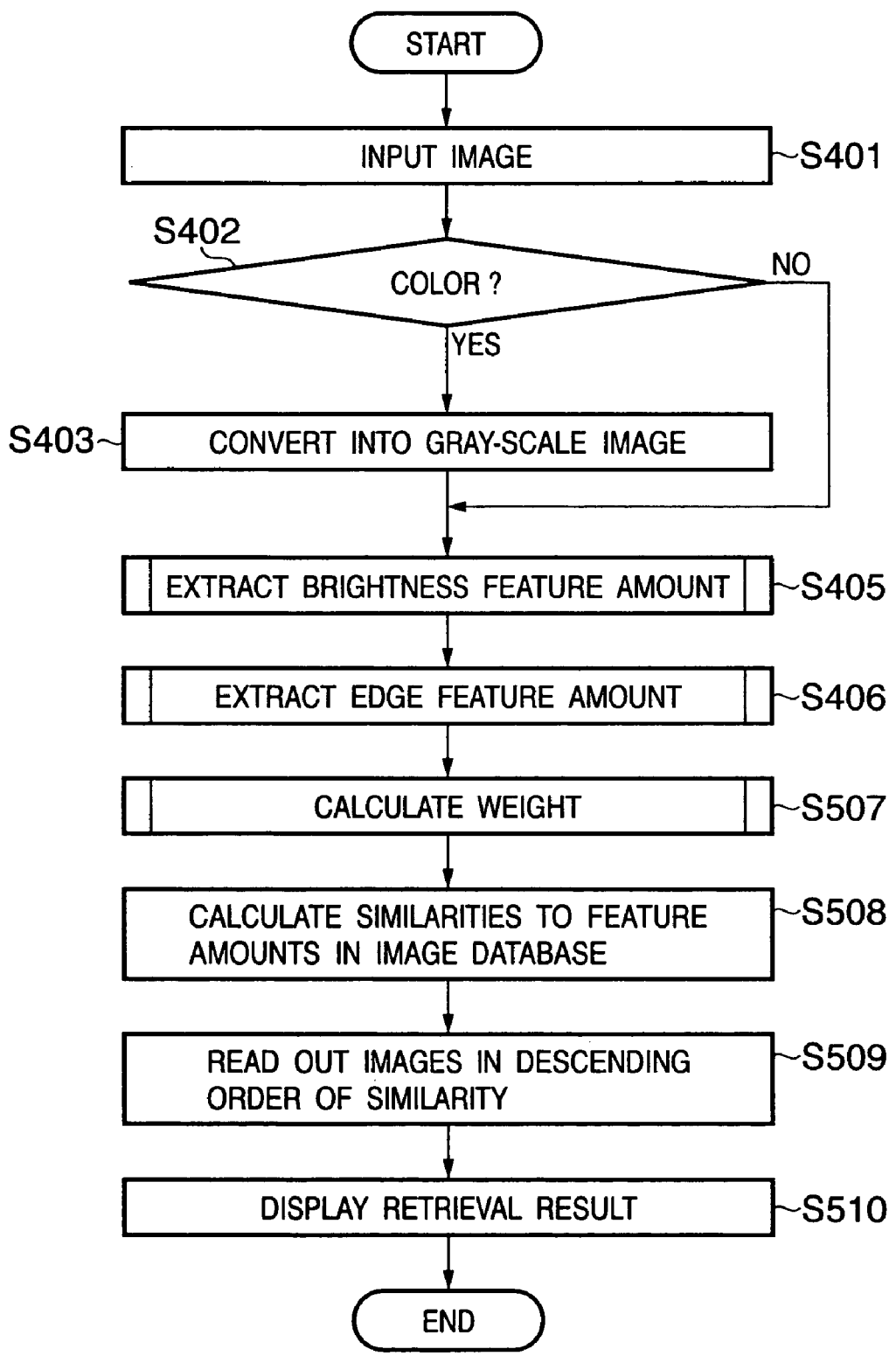
FIG. 4 is a flowchart showing retrieval processing of an image similar to an image (query image) input as a query of an image group registered in an external storage device 206.

Retrieval processing of an image which is similar to an image input as a query (query image) of an image group registered in the external storage device 206, as described above, will be described below using FIG. 4 which is the flowchart of this processing. Note that a program for making the CPU 201 execute processing according to the flowchart of FIG. 4 is saved in the external storage device 206, is loaded onto the RAM 203 under the control of the CPU 201, and is executed by the CPU 201. In this way, this computer executes respective processes to be described later. The same step numbers in the flowchart of FIG. 4 denote the same steps as those in FIG. 3.

Upon detection of a query image transferred from the scanner 210 or digital camera 211 via the I/F 209 or a query image downloaded via the NIC 208, the CPU 201 sequentially inputs data of the query image input to this computer to the RAM 203 after detection (step S401). Note that the input method of a query image to the RAM 203 is not limited to such specific method. In addition, some or all of images held by the external storage device 206 may be loaded onto the RAM 203, and a list of these images may be displayed on the display screen of the display device 207 in the form of thumbnails. Then, the user may select one of these images using the keyboard 204, mouse 205, or the like, and the selected image may be determined as a query image to be used.

The CPU 201 then checks if the query image input to the RAM 203 is a color or gray-scale image (step S402). The checking method is as described above. If the query image is a color image, the flow advances to step S403, and the CPU 201 converts this query image into a gray-scale image (step S403). The conversion method is as described above.

If the query image is a gray-scale image, the flow advances from step S401 to step S405 via step S402.

The CPU 201 executes processing for calculating a brightness feature amount from the query image (gray-scale image) (step S405). The details of the processing in this step is as has been described above using the flowchart of FIG. 6.

The CPU 201 then executes processing for calculating an edge feature amount from the query image (gray-scale image) (step S406). The details of the processing in this step is as has been described above using the flowchart of FIG. 8.

The CPU 201 calculates a weight value Wg for the brightness feature amount of the query image calculated in step S405, and a weight value We for the edge feature amount of the query image calculated in step S406 (step S507). Details of the processing in this step will be described later.

Next, the CPU 201 calculates similarities between the query image and the images registered in the external storage device 206 (step S508). More specifically, the CPU 201 reads out the brightness and edge feature amounts in the index associated with an image (registered image) of interest registered in the external storage device 206 and calculates distances from the brightness and edge feature amounts of the query image.

For example, if the brightness feature amount of the query image is {a1, a2, a3, a4, a5, a6, a7, a8, a9} (since the query image is divided into nine blocks and labels are specified for respective blocks in this embodiment, the number of elements in the brightness feature amount is 9), and that of the registered image of interest is {b1, b2, b3, b4, b5, b6, b7, b8, b9} (since the registered image of interest is divided into nine blocks and labels are specified for respective blocks in this embodiment, the number of elements in the brightness feature amount is 9), a distance D1 between the brightness feature amounts of the query image and registered image of interest can be calculated by:

$$D1 = \sum_{n=1}^{9} |an - bn| \quad (3)$$

On the other hand, the distance between the edge feature amounts of the query image and registered image of interest can be calculated by the same method. That is, if the edge feature amount of the query image is {c1, c2, c3, c4, c5, c6, c7, c8, c9} (since the query image is divided into nine blocks and ratios are calculated for respective blocks in this embodiment, the number of elements in the edge feature amount is 9), and that of the registered image of interest is {d1, d2, d3, d4, d5, d6, d7, d8, d9} (since the registered image of interest is divided into nine blocks and ratios are calculated for respective blocks in this embodiment, the number of elements in the edge feature amount is 9), a distance D2 between the edge feature amounts of the query image and registered image of interest can be calculated by:

$$D2 = \sum_{n=1}^{9} |cn - dn| \quad (4)$$

That is, the smaller the distances of the brightness and edge feature amounts, the higher the similarity between the images is. Hence, the correlation between the distances and similarities are determined to match the human sensation: when the distance is zero, the similarity is 100%, and when the distance is sufficiently large, the similarity is 0%. Then, the distance is converted into a similarity. For example, let M1 be a minimum value (0 when D=D1) that the distance D can assume, and M2 be a maximum value (63 when D=D1). Then, when D=M1, a similarity R is 100%; when D=M2, the similarity R is 0%. Hence, an example of the relational expression between the distance D and similarity R is given by:

$$R = 100 \times (D - M2)/(M1 - M2)$$

Therefore, the CPU 201 calculates a similarity R corresponding to the calculated distance D using this expression. In this manner, a similarity Rg between the brightness feature amounts of the query and registered image of interest, and a similarity Re between the edge feature amounts of the query and registered image of interest can be calculated.

A similarity R between the query image and registered image of interest in comprehensive view of the respective feature amounts is calculated using the similarities Rg and Re calculated for the respective feature amounts (brightness and edge feature amounts) and the weight values Wg and We calculated for the respective feature amounts (brightness and edge feature amounts) in step S507 (step S508) by:

$$R = (Wg \times Rg + We \times Re)/(Wg + We) \quad (5)$$

The similarity R calculated in this way, and the ID of the registered image of interest (the ID included in the index associated with the registered image of interest) are temporarily stored in the RAM 203 as a set.

In this way, the processing for calculating a similarity between the query image and each registered image registered in the external storage device 206 and temporarily storing the calculated similarity and the ID of the registered image to be compared with the query image in the RAM 203 as a set is executed.

Upon completion of the processing for calculating similarities between the query image and all the registered images registered in the external storage device 206, and temporarily storing the similarities and IDs of the registered images in the RAM 203, the CPU 201 refers to sets temporarily stored in the RAM 203 in descending order of similarity, loads images specified by the IDs in the referred sets (strictly speaking, images saved in paths corresponding to the IDs in the referred sets) from the external storage device 206 onto the RAM 203 (step S509), and displays these images in the form of thumbnails together with their similarities on the display screen of the display device 207 in the order from the left to right and from the upper to lower rows (step S510). That is, the thumbnail images of registered images are displayed as a list together with their similarities in descending order of similarity with the query image in the order from the left to right and from the upper to lower rows. In this manner, the user can confirm images similar to the query image of the displayed image group.

Note that the display format is not limited to this. For example, only registered images with higher similarities with the query image may be displayed. In this case, upon referring to a plurality of sets temporarily stored in the RAM 203, load processing of images specified by IDs included in only sets with similarities equal to or higher than a given similarity is executed.

Also, the number of thumbnail images to be displayed on the display screen of the display device 207 may be limited.

<Weight Determination Processing>

The weight value calculation processing in step S507 will be described below. Assume that a sufficient number of registered images are registered in the external storage device 206.

A weight value is calculated based on the following properties. As element values of feature amounts have larger variations, the distance difference apparently appears between similar and non-similar images, and such images can be easily distinguished. Conversely, as element values of feature amounts have smaller variations, the distance difference does not apparently appear between similar and non-similar images and, hence, such images are hard to distinguish. Note that the feature amounts include both brightness and edge feature amounts.

The degree of variation of a feature amount can be recognized by calculating a variance of its element values. For example, since the brightness feature amount of the query image is {a1, a2, a3, a4, a5, a6, a7, a8, a9}, as described above, the variance of the brightness feature amount of the query image can be calculated by:

$$1/(n-1) \times \sum_{i=0}^{i=n-1} \left( ai - \sum_{i=0}^{i=n-1} ai/n \right)^2 \quad (6)$$

The same applies to the other feature amount. Note that "a small variance of the feature amount" means that variations of the label values are small taking the brightness feature amount as an example. For example, when a brightness feature amount has a configuration {1, 1, 1, 1, 1, 2, 2, 2, 2}, "this brightness feature amount has a small variance" (the variance at that time is about 0.28).

Conversely, "a large variance" means that variations of label values are large taking the brightness feature amount as an example. For example, when a brightness feature amount has a configuration {0, 1, 2, 3, 4, 5, 6, 7, 1}, "this brightness feature amount has a large variance" (the variance at that time is about 5.94).

In general, when the variance of the feature amount of the query image is small and that of the feature amount of the registered image is large, or vice versa, the distance between the feature amounts of the query image and registered image always becomes large. For example, when the brightness feature amount of the query image is {1, 1, 1, 1, 1, 2, 2, 2, 2}, and that of the registered image is {0, 1, 2, 3, 4, 5, 6, 7, 1}, their distance is 20. In this embodiment, upon calculating the distance between the brightness feature values of respective images, since the maximum value that this distance can assume is 63, the distance "20" corresponds to 30% or more of the maximum value, and is not small in any sense.

On the other hand, when both the query image and registered image have small variances, the distance between the feature amounts of the query image and registered image always becomes small. In this case, even when one of elements of the feature amount slightly changes, it does not influence the variance of the feature amount. For example, when the brightness feature amount of the query image is {1, 1, 1, 1, 1, 2, 2, 2, 2} and that of the registered image is {2, 1, 1, 1, 1, 2, 2, 2, 2}, these feature amounts have the same variances, and the distance between the feature amounts is as small as 1. Of course, if an arbitrary element is larger by 1, the distance also becomes 1.

Independently of the orders of elements of the feature amounts, the variance value remains the same. For example, when the brightness feature amount of the query image is {1, 1, 1, 1, 1, 2, 2, 2, 2} and that of the registered image is {1, 1, 1, 1, 2, 1, 2, 2, 2}, these feature amounts have the same variances, and the distance between the feature amounts is as small as 2. Of course, even when arbitrary elements are replaced, since a maximum difference between elements is 1, and the number of different elements is four, the distance assumes a value ranging from 0 to 8, and becomes small.

In this way, when images having feature amounts with small variance values are compared, their distance always becomes small, and it is determined that images having feature amounts with small variance values are similar to each other.

However, when a line image shown in, e.g., FIG. 11A or 11B is divided into blocks, and labels are specified for respective blocks, since the average value of the brightness values per block becomes a value approximate to zero (when a pixel value that forms a line portion is 255 and a pixel value that forms the remaining portion is 0), the average brightness values calculated for respective blocks become values close to zero, and elements of the brightness feature amount obtained for such line image have similar values. Obviously, the brightness feature amount of the line image is small.

For example, when a line image shown in FIG. 11A is used as the query image, and a line image shown in FIG. 11B is used as the registered image, the brightness feature amounts of these images have only different element positions or slightly different label values of some elements. Therefore, in this case, since the distance between the brightness feature amounts of the query image and registered image becomes small, a similarity between these query image and registered image is high although they have considerably different appearances.

In this way, when images having feature amounts with small variances are compared to each other, since similar and non-similar images are hard to distinguish, it is not effective to execute retrieval processing based on their feature amounts.

On the other hand, when the variances of the feature amounts of both the query image and registered image are large, the following result is obtained.

When one of elements of the feature amount slightly changes, the variance value changes largely as an element far from the average becomes larger. In any case, the distance between the feature amounts becomes small. This is a logical result since the distance is calculated based on differences of elements. For example, the distance between feature amounts {0, 1, 2, 3, 4, 5, 6, 7, 1} and {0, 1, 2, 3, 4, 5, 6, 7, 0} is 1.

However, when element values of the feature amounts are replaced, their variance values remain the same, but their distance changes over a broader range depending on the way that they are replaced. For example, a distance between a feature amount {0, 1, 2, 3, 4, 5, 6, 7, 1} and a feature amount obtained by replacing the element values of this feature amount, i.e., {7, 5, 4, 3, 2, 1, 1, 0, 6}, is 36 (maximum value). This is because differences between elements become large since element values vary. Of course, when element values are largely replaced like {0, 1, 2, 3, 4, 5, 6, 7, 1} and {7, 5, 4, 3, 2, 1, 1, 0, 6}, images themselves must be largely different. Also, images having feature amounts in which only some elements are slightly different must be similar to each other.

In this manner, when images having feature amounts with large variance values are compared to each other, their distance becomes largely different between when they are similar to each other and when they are not. Hence, similar and non-similar images can be easily distinguished based on their feature amounts, and it is very effective to conduct retrieval processing using their feature amounts.

Figure 12:
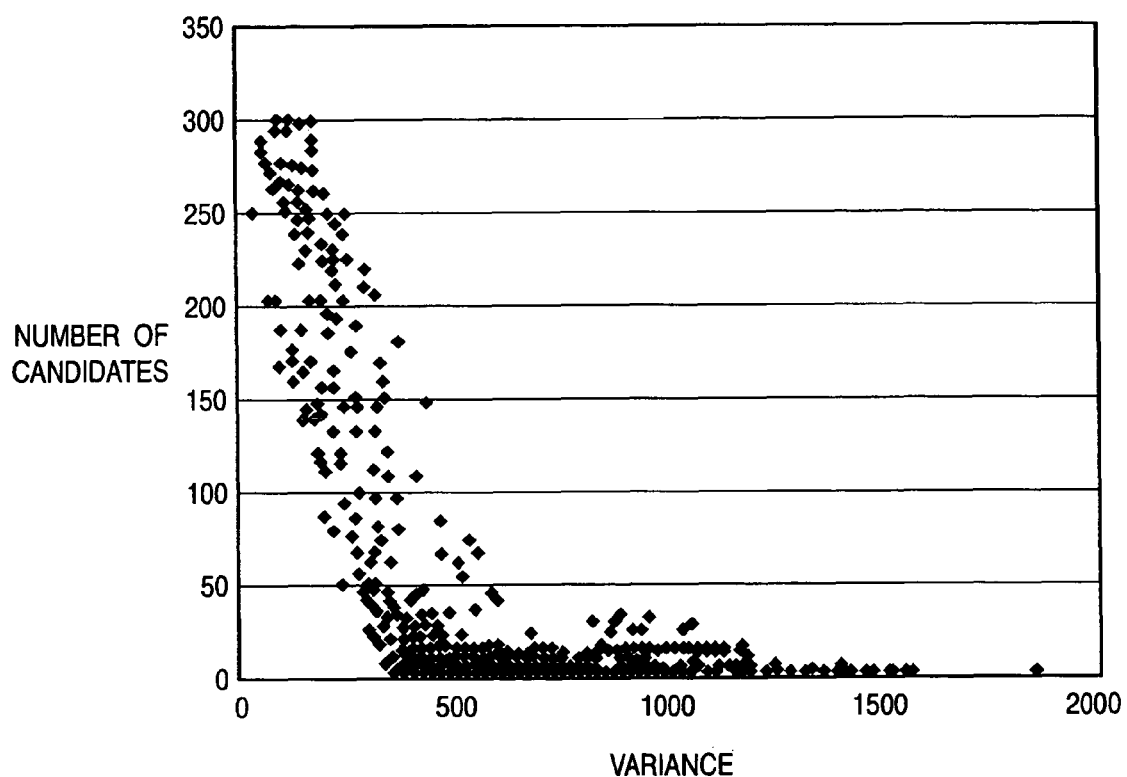
FIG. 12 is a graph showing the relationship between the variance of the feature amount of a query image and the number of registered images (candidates) having similarities of a predetermined value or higher (similarities at which they are considered to be similar to each other) to the query image.

FIG. 12 is a graph showing the relationship between the variance of the feature amount of a query image and the number of registered images (candidates) having similarities of a predetermined value or higher (similarities at which they are considered to be similar to each other) to the query image. As shown in FIG. 12, as the feature amount of the query image has a smaller variance, the number of registered images which are considered to be similar to such query image becomes larger. Conversely, as the feature amount of the query image has a larger variance, the number of registered images which are considered to be similar to such query image becomes smaller. As shown in FIG. 12, the number of registered images which are considered to be similar to the query image becomes extremely small when the variance exceeds a predetermined value (around 400 in FIG. 12).

When the number of registered images which are considered to be similar to the query image is large, this means that the registered images which are considered to be similar to the query image are hard to distinguish from other registered images. Conversely, when the number of registered images which are considered to be similar to the query image is small, this means that the registered images which are considered to be similar to the query image can be easily distinguished from other registered images.

Therefore, as can be seen from the above description, when retrieval processing of registered images (that of registered images similar to a query image) is conducted using feature amounts, the feature amounts are effective when the variance value of the feature amount of the query image is equal to or larger than a predetermined value, i.e., when registered images which are considered to be similar to the query image can be easily distinguished from other registered images.

Hence, this predetermined value is calculated in advance, and is used as a threshold. When the variance of the feature amount is larger than this threshold, since this feature amount is effective in retrieval, a large weight value is set for this feature amount. Conversely, when the variance of the feature amount is smaller than this threshold, since this feature amount is not effective in retrieval, a small weight value is set for this feature amount.

Based on the above description, the processing for calculating the weight values for the brightness and edge feature amounts will be explained.

Figure 10:
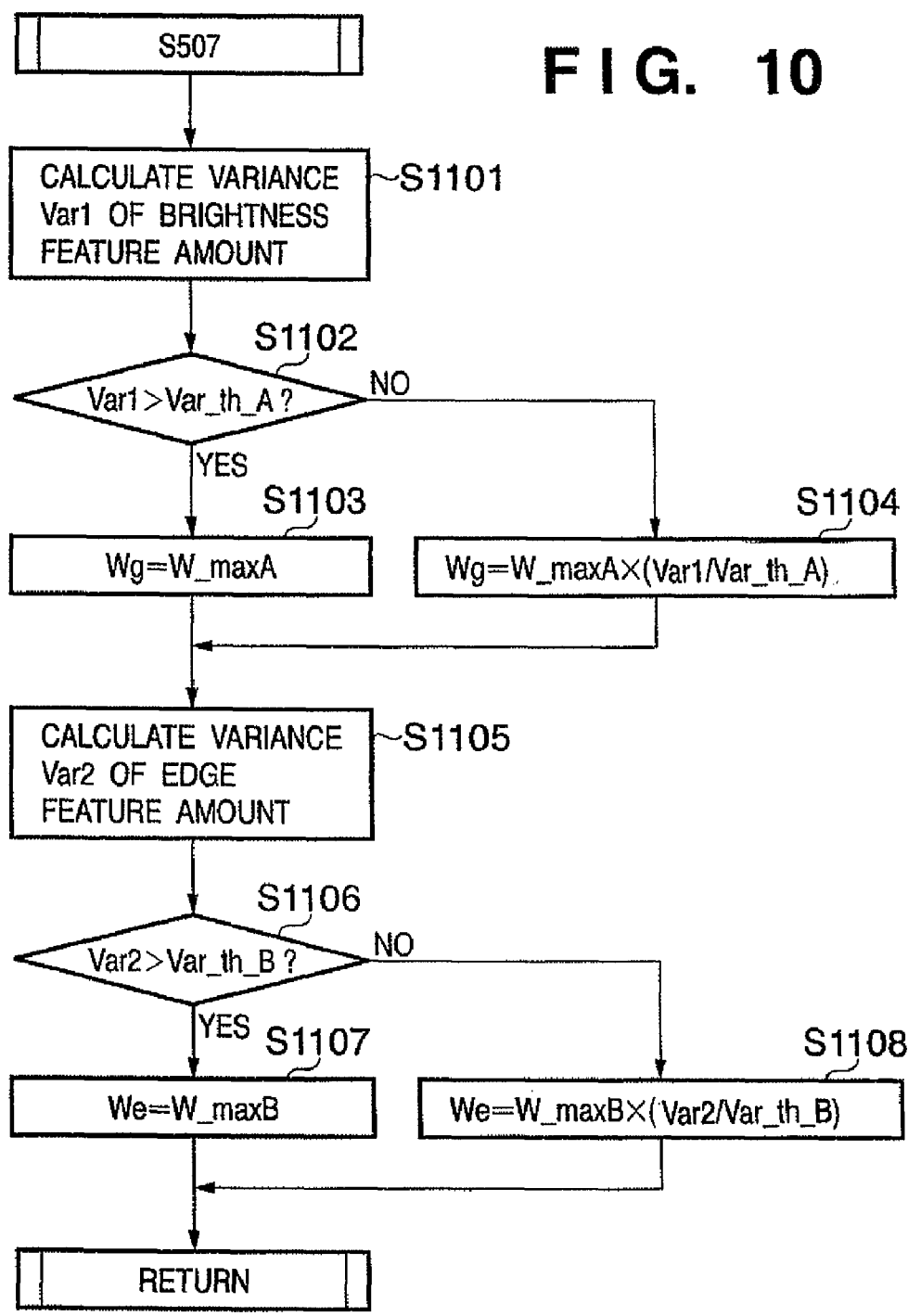
FIG. 10 is a flowchart sowing details of weight value calculation processing in step S507.

FIG. 10 is a flowchart showing details of the weight value calculation processing in step S507.

A variance (Var1) is calculated by a known calculation method with reference to respective element values of the brightness feature amount of the query image (step S1101). The calculated variance Var1 is compared with the threshold (Var_th_A) which is statistically calculated in advance for the brightness feature amount of the query image (step S1102). If Var1>Var_th_A, the flow advances to step S1103 to set a predetermined maximum value W_maxA as the weight value Wg for the brightness feature amount (step S1103).

On the other hand, if Var1≦Var_th_A, the flow advances to step S1104, and the weight value Wg for the brightness feature amount is set (step S1104) using:

$$Wg = W\_maxA \times (Var1/Var_{13}th\_A) \quad (7)$$

With the above processing, the weight value Wg for the brightness feature amount can be set. Next, processing for setting the weight value We for the edge feature amount is executed.

A variance (Var2) is calculated by a known calculation method with reference to respective element values of the edge feature amount of the query image (step S1105). The calculated variance Var2 is compared with the threshold (Var_th_B) which is statistically calculated in advance for the edge feature amount of the query image (step S1106). If Var2>Var_th_B, the flow advances to step S1107 to set a predetermined maximum value W_maxB as the weight value We for the edge feature amount (step S1107).

On the other hand, if Var2≦Var_th_B, the flow advances to step S1108, and the weight value We for the edge feature amount is set using:

$$We = W\_maxB \times (Var2/Var\_th\_B) \quad (8)$$

With the above processing, the weight value We for the edge feature amount can be set. The control then returns to step S508 in FIG. 4.

In this way, since the weight values are set in accordance with the variances of the feature amounts of the query image, and the feature amount with which registered images which are considered to be similar to the query image can be easily distinguished from other registered images is weighted and is used in the retrieval processing, retrieval with higher precision can be implemented.

Second Embodiment

The first embodiment is premised on that a sufficient number of images are registered in the external storage device 206, i.e., images similar to all types of query images are registered. However, when the number of registered images is small or when registered images are biased to certain types, the following problem is posed.

For example, a case will be examined below wherein not many registered images having brightness feature amounts with variances which are less than the threshold Var_th_A are registered in the external storage device 206, and the variance of the brightness feature amount of the query image is less than the threshold Var_th_A.

In such case, it becomes difficult to retrieve based on the brightness feature amount. This is for the following reason. That is, as described in the first embodiment, when the variance of the brightness feature amount of the query image is less than the threshold Var_th_A, registered images which are considered to be similar to such query image are hard to distinguish from other registered images. Furthermore, since the number of registered images having brightness feature amounts with variances which are less than the threshold Var_th_A is small, the probability of the presence of registered images having high similarities with the query image becomes low.

In this embodiment, in such case, since the brightness feature amount is considered not to be effective in retrieval, the weight value Wg for the brightness feature amount is set to be zero (or a value close to zero). The same applies to the edge feature amount.

This embodiment is substantially the same as the first embodiment, except for points to be described below. Therefore, the basic arrangement and functional arrangement of the information processing apparatus according to this embodiment are the same as those in the first embodiment.

<Registration Processing>

Figure 13:
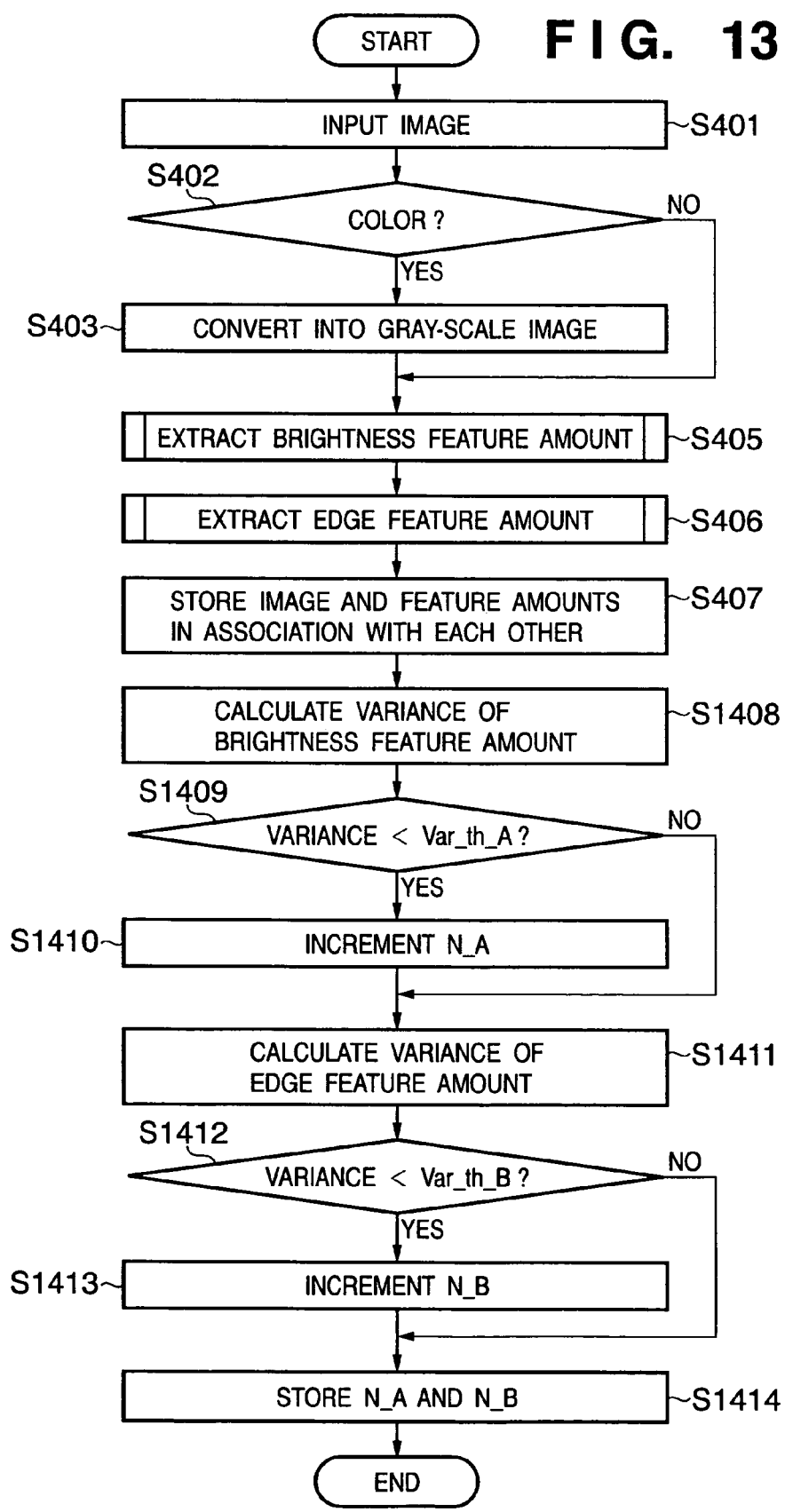
FIG. 13 is a flowchart showing processing for registering an image in the computer.

Processing for registering an image in this computer will be described below using FIG. 13 which is a flowchart of this processing. Note that the same step numbers in FIG. 13 denote the same steps as in FIG. 3, and a description thereof will be omitted. That is, as in the first embodiment, by executing the processes in steps S401 to S407, an input image (gray-scale image) is registered in the external storage device 206 together with its index. After that, a variance Var1 of the brightness feature amount extracted in step S405 is calculated (step S1408). The calculated variance Var1 is compared with the threshold Var_th_A (step S1409). If the calculated variance Var1 is less than the threshold Var_th_A, the flow advances to step S1410, and a value held by a variable N_A (which is reset to zero before the beginning of this processing) is incremented by one (step S1410). That is, the variable N_A is used to count the number of images which meet Var1<Var_th_A.

Next, a variance Var2 of the edge feature amount extracted in step S406 is calculated (step S1411), and the calculated variance Var2 is compared with the threshold Var_th_B (step S1412). If the calculated variance Var2 is less than the threshold Var_th_B, the flow advances to step S1413, and a value held by a variable N_B (which is reset to zero before the beginning of this processing) is incremented by one (step S1413). That is, the variable N_B is used to count the number of images which meet Var2<Var_th_B. Then, the values held by the variables N_A and N_B are saved in the external storage device 206 (step S1414).

In this way, one image is registered in the external storage device 206. Then, such processing is executed for each image input to this computer. As a result, the external storage device 206 saves the number of images which meet Var1<Var_th_A, and the number of images which meet Var2<Var_th_B.

Note that the image and index to be saved in the external storage device 206 may be compressed as needed. In this case, after the image and index are read out in the following description, decompression processing must be executed.

<Retrieval Processing>

Figure 14:
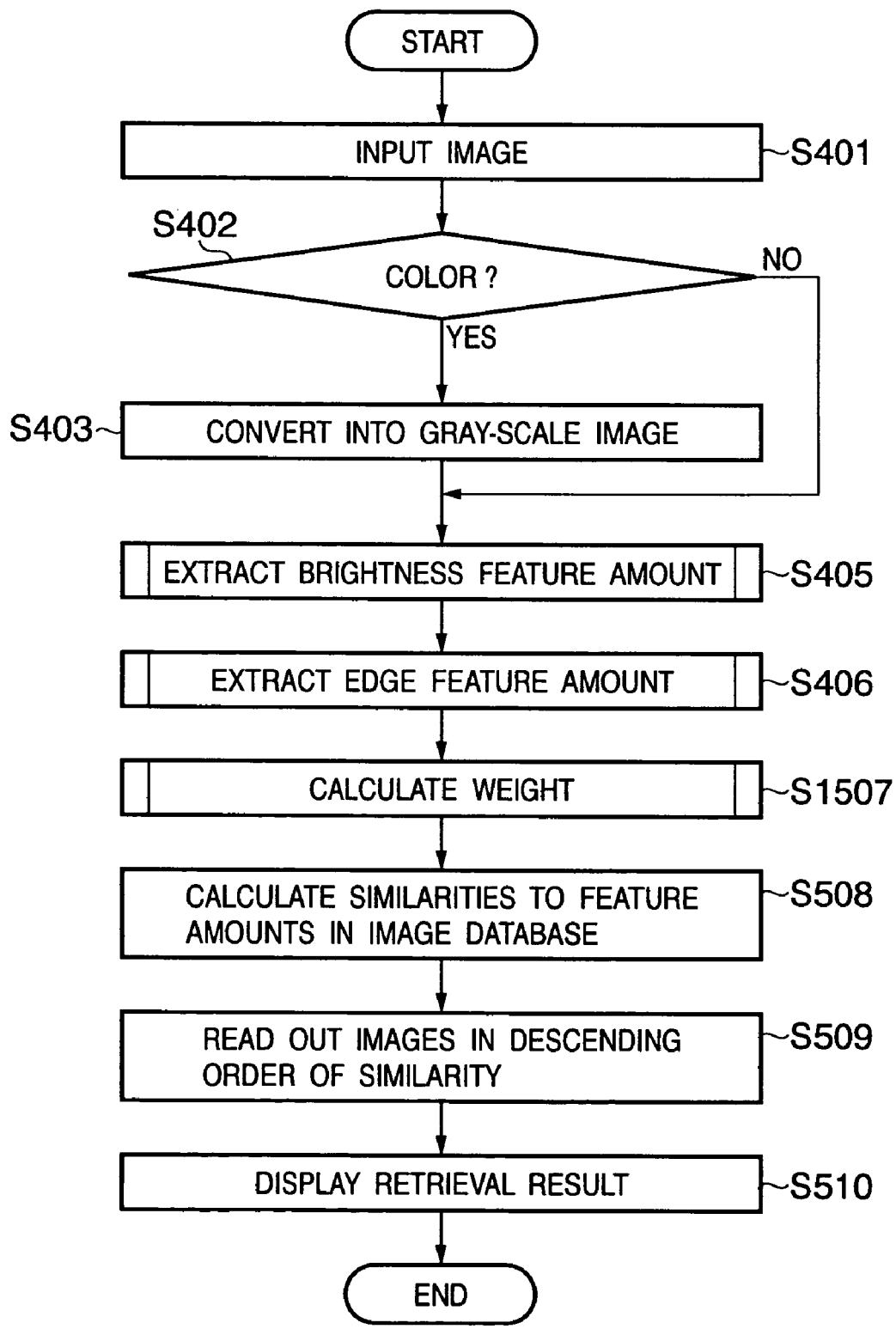
FIG. 14 is a flowchart showing retrieval processing of an image similar to an image (query image) input as a query of an image group registered in the external storage device 206.

The retrieval processing of an image similar to an image (query image) input as a query of an image group registered in the external storage device 206, as described above, will be described below using FIG. 14 which is a flowchart of this processing. Note that a program for making the CPU 201 execute processing according to the flowchart of FIG. 14 is saved in the external storage device 206, is loaded onto the RAM 203 under the control of the CPU 201, and is executed by the CPU 201. In this way, this computer executes respective processes to be described later.

The flowchart shown in FIG. 14 is substantially the same as that in the first embodiment, except for the weight value calculation processing in step S1507 (step S507 in FIG. 4). Therefore, the "weight value calculation processing" in step S1507 will be described below.

Figure 15:
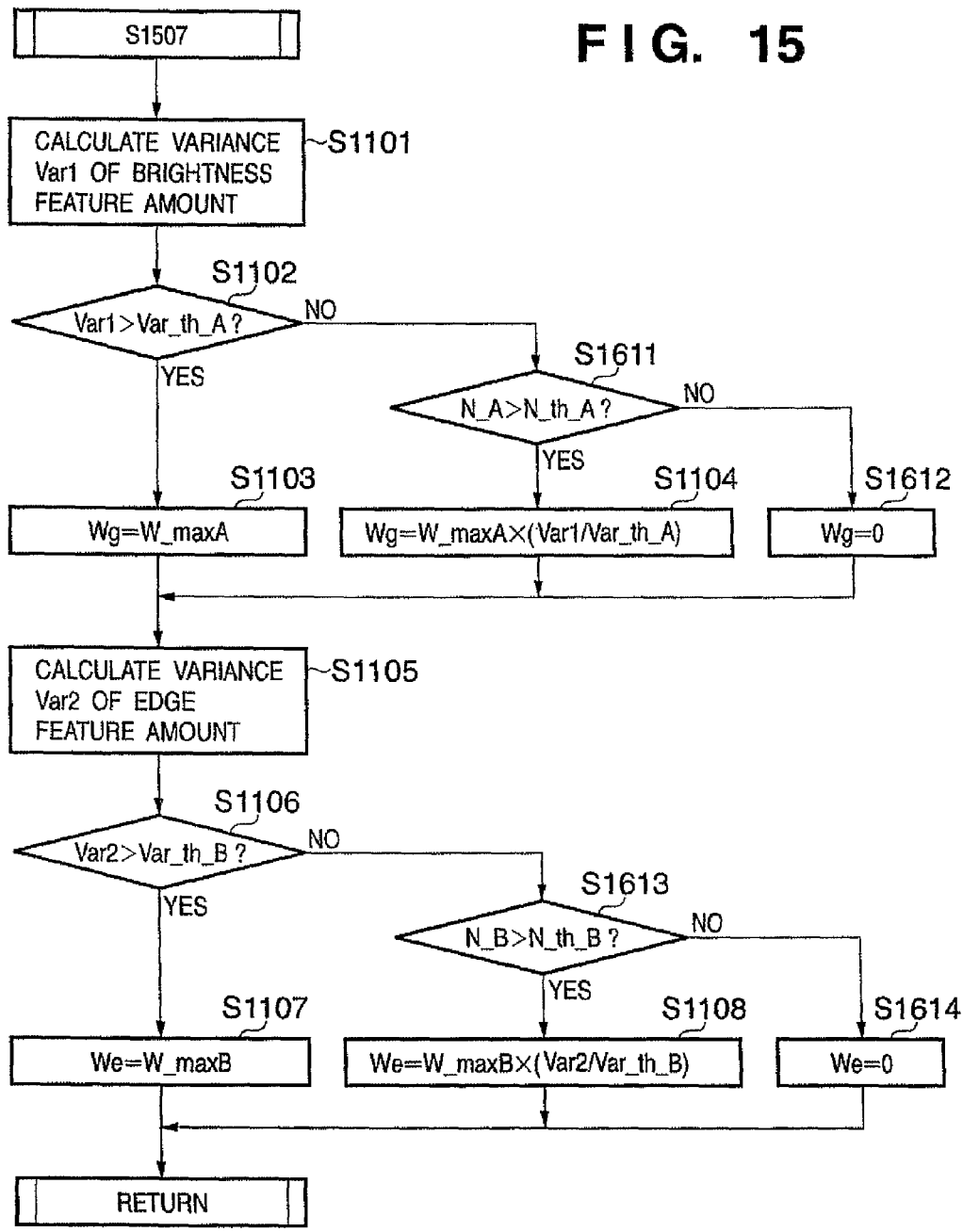
FIG. 15 is a flowchart showing details of weight value calculation processing in step S1507.

FIG. 15 is a flowchart showing details of the weight value calculation processing in step S1507. Note that the same step numbers in FIG. 15 denote the same steps as in FIG. 10, and a description thereof will be omitted.

The processing for setting the weight value Wg for the brightness feature amount is executed first as in the first embodiment. If Var1≦Var_th_A in the checking process in step S1102, the flow advances to step S1611 to compare the value held by the variable N_A with a threshold N_th_A which is statistically calculated in advance (step S1611). If N_A>N_th_A, the flow advances to step S1104 to set the weight value Wg as in the first embodiment. On the other hand, if N_A≦N_th_A, the flow advances to step S1612 to set zero as the weight value Wg (step S1612).

Next, the processing for setting the weight value We for the edge feature amount is executed first as in the first embodiment. If Var2≦Var_th_B in the checking process in step S1106, the flow advances to step S1613 to compare the value held by the variable N_B with a threshold N_th_B which is statistically calculated in advance (step S1613). If N_B>N_th_B, the flow advances to step S1108 to set the weight value We as in the first embodiment. On the other hand, if N_B≦N_th_B, the flow advances to step S1614 to set zero as the weight value We (step S1614).

Other Embodiments

In the first and second embodiments, two image features, i.e., the brightness and edge feature amounts are used upon executing image retrieval. However, the present invention is not limited to such specific features, and other features, for example, a color feature amount, texture feature amount, and the like may be used. The number of feature amounts need not always be two, and three or more feature amounts may be used.

In the first and second embodiments, label values of the average brightness values of respective blocks are used as the brightness feature amount. The present invention is not limited to this. For example, the brightness histogram of the entire image, label values of highest-frequency brightness values for respective blocks, and the like may be used.

Likewise, the edge feature amount is not limited to the ratios of edges for respective blocks. For example, the total amount of edges of the entire image, the ratios of pixels having edges compiled for respective edge directions, a histogram, and the like may be used.

In the first and second embodiments, the distance between the query image and registered image is calculated by calculating the sum total of the absolute values of differences between elements as in equations (3) and (4). The calculation method is not limited to this. For example, a distance may be calculated by obtaining, e.g., the square sum of differences between elements.

Also, the equations used to calculate the weight values are not limited to equations (7) and (8) and, for example, these equations may be respectively replaced by:

$$Wg = W\_maxA \times (Var1/Var\_th\_A)^2) \quad (9)$$

$$We = W\_maxB \times (Var2/Var\_th\_B)^2) \quad (10)$$

If the retrieval precision allows, when the calculated weight value is a value close to zero, it may be set to be zero. For example, in the processing for calculating the distances between the feature amounts of the query image and registered image, which is executed after the weight values are calculated, the distance calculation may be skipped for the feature amount with zero weight value. In this way, the overall processing can be speeded up.

In the first and second embodiments, images are to be retrieved, and image feature amounts are handled. However, the present invention is not limited to them. Even when moving image data, audio data, or language data is used as an object to be retrieved, if feature amounts can be expressed by N-dimensional vectors, their variances may be calculated to set appropriate thresholds, thus allowing weight calculations as in the present invention. Furthermore, when an image includes a photo part and text part like in an image obtained by scanning a paper document, and retrieval results based on image and text feature amounts are integrated by weighting them, the weight values can be calculated by the same method as in the present invention.

Various embodiments of the present invention have been explained in detail, and the present invention can be practiced in the forms of, e.g., a system, apparatus, method, program, storage medium, and the like. Also, the present invention can be applied to either a system constituted by a plurality of devices, or an apparatus consisting of a single equipment.

Note that the present invention includes a case wherein the invention is achieved by directly or remotely supplying a program of software (those which correspond to the illustrated flowcharts in the above embodiments) that implements the functions of the aforementioned embodiments to a system or apparatus, and reading out and executing the supplied program code by a computer of that system or apparatus.

Therefore, the program code itself installed in a computer to implement the functional process of the present invention using the computer implements the present invention. That is, the present invention includes the computer program itself for implementing the functional process of the present invention.

In this case, the form of program is not particularly limited, and an object code, a program to be executed by an interpreter, script data to be supplied to an OS, and the like may be used as along as they have the program function.

As a recording medium for supplying the program, for example, a floppy® disk, hard disk, optical disk, magnetooptical disk, MO, CD-ROM, CD-R, CD-RW, magnetic tape, nonvolatile memory card, ROM, DVD (DVD-ROM, DVD-R), and the like may be used.

As another program supply method, the program may be supplied by establishing connection to a home page on the Internet using a browser on a client computer, and downloading the computer program itself of the present invention or a compressed file containing an automatic installation function from the home page onto a recording medium such as a hard disk or the like. Also, the program code that forms the program of the present invention may be segmented into a plurality of files, which may be downloaded from different home pages. That is, the present invention includes a WWW server which makes a plurality of users download a program file required to implement the functional process of the present invention by the computer.

Also, a storage medium such as a CD-ROM or the like, which stores the encrypted program of the present invention, may be delivered to the user, the user who has cleared a predetermined condition may be allowed to download key information that decrypts the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-304341 filed on Oct. 19, 2004, which is hereby incorporated by reference herein.

What is claimed is:

1. An information processing apparatus comprising:
   holding means for holding a plurality of images;
   input means for inputting a query image;
   feature amount acquisition means for dividing the query image into a plurality of blocks, and calculating plural kinds of feature amounts including a luminance feature amount and an edge feature amount for each of the divided blocks;
   variance calculation means for calculating a variation of all feature amounts belonging to an identical kind, for each of the plural kinds;
   similarity calculations means for calculating a similarity between the query image and an image of interest held in said holding means for each of the plural kinds;
   weight calculation means for calculating a weight value for each of the plural kinds, wherein the weight value is larger for a kind with a large variation and is smaller for a kind with a small variation;
   weighting means for weighting the similarity calculated for each of the plural kinds by using the weight value calculated for each of the plural kinds, respectively; and
   retrieving means for retrieving a similar candidate, from said holding means, by using the weighted similarities.

2. The apparatus according to claim 1, wherein when a variation is larger than a predetermined threshold, said weighting means weights by using a maximum weight value, and when a variation is smaller than the predetermined threshold, said weighting means weights by using a weight value that decreases with decreasing variation.

3. The apparatus according to claim 1, wherein letting Var be the variation, Var_th be a predetermined threshold for the variation, W be a weight value, and W_max be a maximum value predetermined for the weight value, said weighting means weights by using the weight value obtained by calculating:

$$W = W\_max \times (Var/Var\_th)$$

if $Var \leq Var\_th$, and $$W = W\_max$$

if $Var > Var\_th$.

4. An information processing method to be executed by an information processing apparatus which comprises holding means for holding a plurality of images, the method comprising:
   an input step of inputting a query image;
   a feature amount acquisition step of dividing the query image into a plurality of blocks, and calculating plural kinds of feature amounts including a luminance feature amount and an edge feature amount for each of the divided blocks;
   a variance calculation step of calculating a variation of all feature amounts belonging to an identical kind, for each of the plural kinds;
   a similarity calculation step of calculating a similarity between the query image and an image of interest held in said holding means for each of the plural kinds;
   weight calculation step of calculating a weight value for each of the plural kinds, wherein the weight value is larger for a kind with a large variation and is smaller for a kind with a small variation;
   a weighting step of weighting the similarity calculated for each of the plural kinds by using the weight value calculated for each of the plural kinds, respectively; and
   a retrieving step of retrieving a similar candidate, from said holding means, by using the weighted similarities.

5. A non-transitory computer readable storage medium storing a computer executable program, the computer-executable program being executable by a computer so as to cause the computer to execute an information processing method of claim 4.

* * * * *